April 12, 1938.　　　　D. R. GIFT　　　　2,113,686
DEVICE FOR MEASURING VOLUME WITH COMPRESSED AIR
Filed July 24, 1936
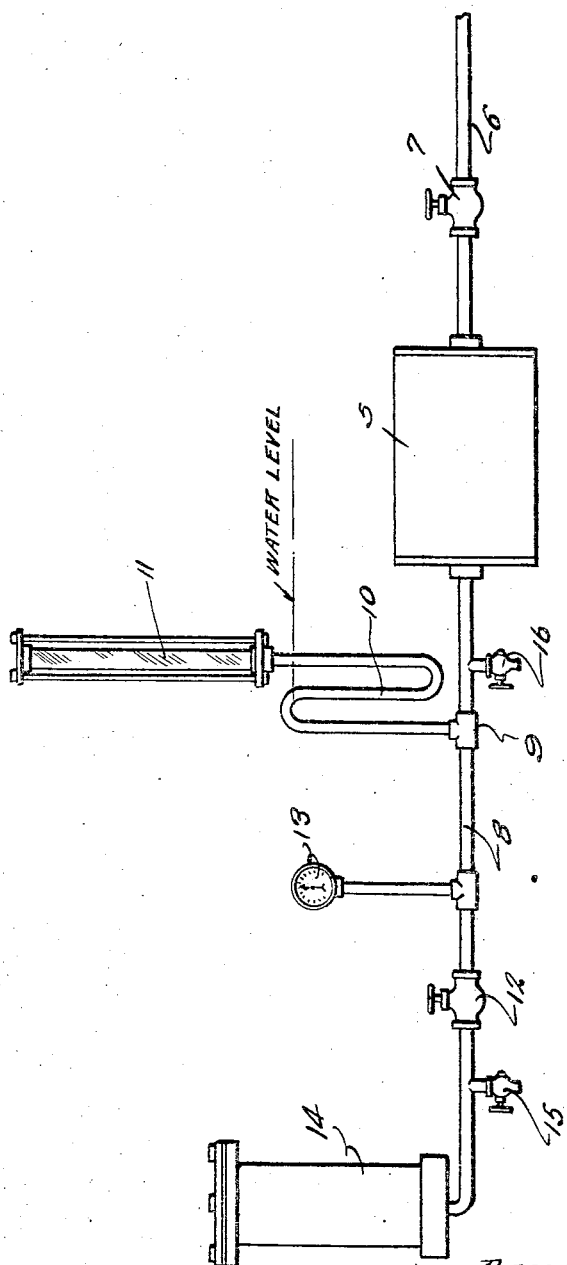
Inventor
Daniel R. Gift
By Clarence A. O'Brien
Hyman Berman
Attorneys Patented Apr. 12, 1938

2,113,686

UNITED STATES PATENT OFFICE 2,113,686

DEVICE FOR MEASURING VOLUME WITH COMPRESSED AIR

Daniel R. Gift, Raleigh, N. C.

Application July 24, 1936, Serial No. 92,458

1 Claim. (Cl. 73—51)

This device is primarily designed for measuring volume and proportioning the union of concrete by voids with the use of compressed air.

The invention together with its objects and advantages will be best understood from a study of the following description taken in connection with the accompanying drawing wherein:

The single view illustrates somewhat diagrammatically the apparatus forming the subject matter of the invention.

Referring to the drawing in detail it will be seen that the apparatus comprises a tank 5 to one end of which is connected an air supply pipe 6 having arranged therein a valve 7.

To the opposite end of the tank 5 is connected a pipe 8. Connected with the pipe 8 through the medium of a union 9 and a pipe 10 is a water glass 11 of any suitable construction. In this connection it will be noted that pipe 10 has its respective opposite ends reversely bent the downwardly directed end being connected with the union 9 and the upwardly directed end being connected with the sight glass 11.

Also connected with the pipe 8 between the union 9 and a valve 12 is a pressure gauge 13.

The pipe 8 serves to connect the tank 5 with a tank 14 and arranged in the pipe 8 between the tank 14 and the valve 12 is a valve 15; while arranged in the pipe 8 between the fitting 9 and the tank 5 is a valve 16.

In measuring volumes and proportioning concrete aggregate with this invention and through the medium of compressed air the first operation is as follows:

Valve 12 is closed, air from the compressor is allowed to enter tank 5 to a pressure of 80 pounds per square inch registered on air gauge 13. Valve 7 is then closed and the air is drained down to exactly 80 pounds by the use of pet-cock 16. A point of graduation is marked on the water glass at the water level in gauge 10.

Tank 14 is air tight but empty. The valve 12 is now opened and the air allowed to equalize between tanks 5 and 14. The water in gauge pipe 10 will settle to another point of graduation representing the reading for the full volume of air in tank 14. This point is a point of graduation and should be marked on the water glass and recorded.

The second operation is to close valve 12 again and empty tank 14 of air by means of valve 15. Valve 7 is again opened and the air pressure in tank 5 brought up to the graduation on the water glass 11 representing 80 pounds pressure. Valve 7 is again closed and by pet-cock 16 the water line in the pipe 10 is set exactly to the graduation representing 80 pounds pressure. Any known volume is now put into tank 14 and the tank closed air tight. The space or voids in the tank 14 is the total volume of the tank less the known volume put into the tank. Valve 12 is now opened and the air pressure of tanks 5 and 14 will equalize. The water line in the gauge 11 will again sink to a new level which should be marked and recorded as the graduation representing the space in tank 14 of the total volume of the tank minus the given known volume used.

This second operation is repeated with as many different known volumes as desired to make numerous graduations on water gauge 11. The operations are continued until the tank 14 is filled entirely with known volumes in which case only, it is used to proportion aggregates for concrete as the volumes of any aggregates less than the full capacity of the tank 14 is not known. Any known volume can be used in this graduation process including water at 4 degrees C., and these graduations will apply only when working at 80 pounds air pressure. If another pressure is desired, new graduations will need be worked out on gauge 11 in the same manner as explained for 80 pounds pressure.

The third operation in measuring voids in any irregular shaped solids is as follows:

Close valve 12. Measuring tank 14 is filled with the solids and closed air tight. Valve 7 is opened and the pressure brought exactly to the point on gauge 11 representing 80 pounds pressure. Valve 7 is closed and valve 12 opened allowing the air pressure in tanks 5 and 14 to equalize. The level of the water in gauge 11 represents the graduation for the voids and the volume of these voids is taken from the table made up by recording the various graduations in the second operation as explained above. In as much as the variations between the recorded readings for voids in the graduations process are almost constant, interpolation can be made in case the readings of voids does not fall on a graduation point. In other words, if the total capacity of the tank be represented by the numeral 100 and the voids measured after filling the tank with coarse aggregate were found to be 46%, then the solid particles in the tank represents 54% of the total tank capacity. If the voids measure 15.3% after adding finer aggregate, then the latter occupies 30.7% of the full tank capacity. When no voids are indicated after the addition of cement to the aggregates, then it is apparent that the cement particles occupy 15.3% of the tank's capacity. Then, the solid particles of aggregates and cement occupy the full capacity of the tank.

In proportions for concrete aggregates using the full capacity of the tank as the only unit of volume the volume of voids obtained is subtracted from the total capacity of the tank. This result will be the actual volume of solid particles in that unit. These results of the solid particles of all aggregates and cement are added together and the total should equal the capacity of the tank. This gives an excellent check on the accuracy of the apparatus and operator. Any small error must be distributed over the aggregates (except cement), prorated in their relative percentages of volume.

The purpose of this process is to arrive at the most perfect union of all particles given to make a solid mass.

Having thus described the invention what is claimed as new is:—

An apparatus for measuring volume and proportioning the union of concrete by voids with the use of compressed air, comprising an air tank, a valve equipped conduit connected with one end of the tank for supplying compressed air to the tank, a second tank for receiving the aggregates, a conduit connecting the first and second tanks and communicating with the second tank through the bottom of the latter, an air pressure gauge connected with the second conduit intermediate the tanks, a water glass, a sinuous gauge tube connected at one end with the water glass and at a relatively opposite end with the second conduit intermediate the pressure gauge and the first named tank, a pet cock connected with the second conduit intermediate the connection between the second conduit and the sinuous gauge pipe on the one hand and the first mentioned tank on the other hand, a pet cock connected with the second conduit intermediate the pressure gauge and the second named tank, and a valve interposed in the second conduit intermediate the last mentioned pet cock and the pressure gauge.

DANIEL R. GIFT.